US007213582B2

(12) United States Patent
Treudt et al.

(10) Patent No.: US 7,213,582 B2
(45) Date of Patent: May 8, 2007

(54) VENT VALVE FOR A FUEL TANK

(75) Inventors: Volker Treudt, Windeck (DE); Werner Buse, Kaarst (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 11/316,690

(22) Filed: Dec. 22, 2005

(65) Prior Publication Data

US 2006/0191578 A1 Aug. 31, 2006

(30) Foreign Application Priority Data

Dec. 22, 2004 (DE) .................. 10 2004 063 008

(51) Int. Cl.
*F02M 37/20* (2006.01)
*F02M 37/00* (2006.01)

(52) U.S. Cl. ....................... 123/516; 137/588
(58) Field of Classification Search ............... 123/516, 123/518, 519, 520; 141/59, 302; 137/587, 137/588
See application file for complete search history.

(56) References Cited

U.S. PATENT DOCUMENTS

| | | | | |
|---|---|---|---|---|
| 4,934,417 A * | 6/1990 | Bucci | ............................. | 141/1 |
| 5,099,880 A * | 3/1992 | Szlaga et al. | ................ | 137/587 |
| 5,327,934 A * | 7/1994 | Thompson | .................. | 137/588 |
| 5,640,993 A * | 6/1997 | Kasugai et al. | ............. | 137/587 |
| 5,775,392 A * | 7/1998 | Kraft | ........................... | 141/382 |
| 6,000,426 A * | 12/1999 | Tuckey et al. | .............. | 137/588 |
| 6,003,499 A * | 12/1999 | Devall et al. | ............... | 123/520 |
| 6,006,799 A | 12/1999 | Kraft et al. | | |
| 6,871,677 B2 * | 3/2005 | Zerangue, Sr. | ............... | 141/83 |
| 2003/0209280 A1 * | 11/2003 | Zerangue | ....................... | 141/4 |
| 2004/0187850 A1 * | 9/2004 | Bergsma | ..................... | 123/520 |
| 2006/0011257 A1 * | 1/2006 | Devall | ......................... | 141/59 |
| 2006/0032546 A1 * | 2/2006 | Bolle et al. | ................... | 141/59 |

FOREIGN PATENT DOCUMENTS

DE 198 02 078 A1 8/1998

* cited by examiner

*Primary Examiner*—Mahmoud Gimie
(74) *Attorney, Agent, or Firm*—Grossman Tucker Perreault & Pfleger, PLLC

(57) ABSTRACT

A compact venting valve for the fuel tank of a motor vehicle comprises a valve housing with at least one switchable element for providing at least two switching positions and with at least three connections, a first connection to the fuel tank or to a fuel vapor filter connected downstream thereof, a second connection to a filling pipe of a fuel tank and a third connection to atmosphere. The valve housing includes at least one first filter chamber enclosing a second fuel vapor filter, wherein a first switching position provides for operational venting of the fuel tank in which a flow path between the first and second connections is enabled and a second switching position provides for refuelling venting of the fuel tank in which a flow path between the first and second connections is enabled with the second fuel vapor filter being bypassed.

11 Claims, 4 Drawing Sheets

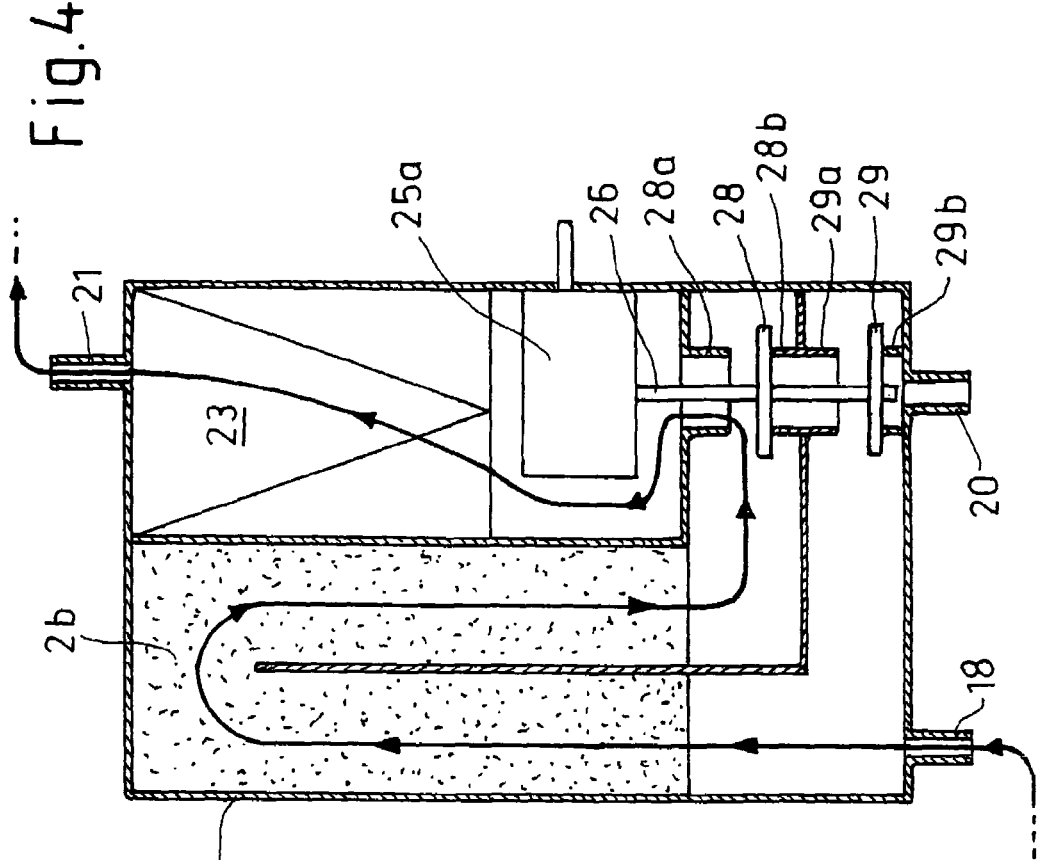
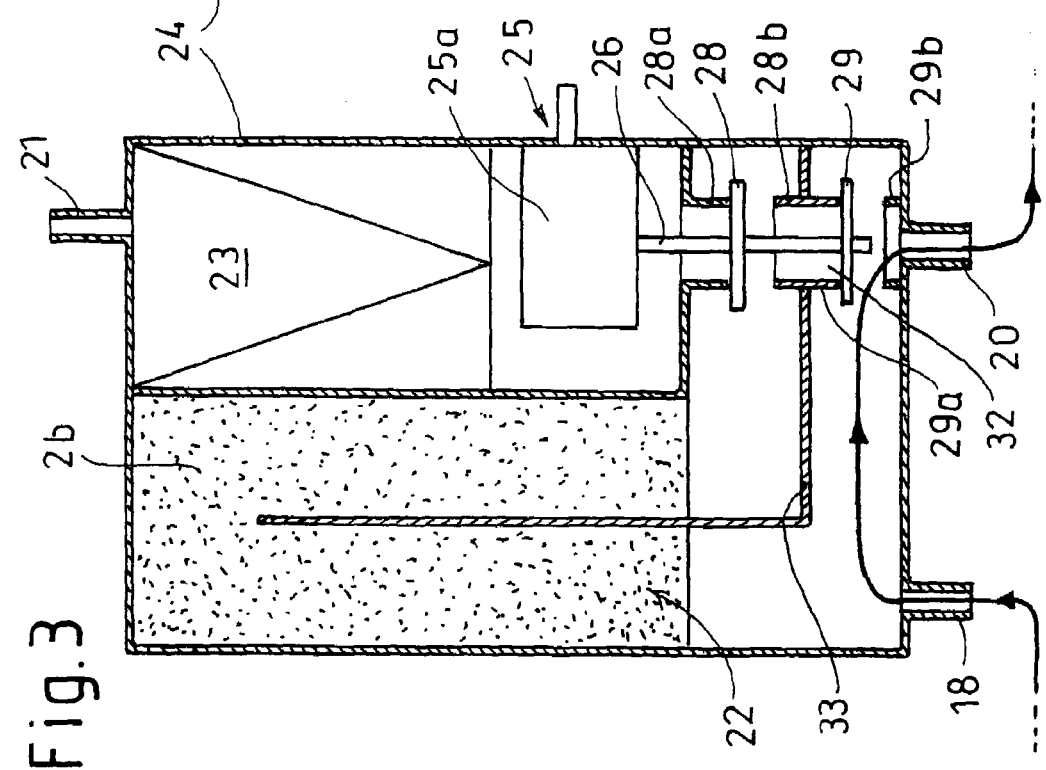

VENT VALVE FOR A FUEL TANK

CROSS-REFERENCES TO RELATED APPLICATIONS

This application claims the priority of German patent application Ser. No 10 2004 063 008.9 filed Dec. 22, 2004, the subject-matter of which is incorporated herein by reference.

FIELD OF THE INVENTION

The present invention concerns a vent valve for a fuel tank and more particularly a vent valve for a fuel tank of a motor vehicle.

BACKGROUND OF THE INVENTION

A fuel tank for a motor vehicle is usually provided with valves for operational venting and for refuelling venting. It will be noted at this point that the term operational venting is used herein to denote venting the fuel tank during operation of the vehicle, while refuelling venting is used herein to denote venting the tank during a tank filling or refuelling procedure.

Thus, during operation of a motor vehicle in which a tank is installed liquid fuel may at least partially change from the liquid state into the gaseous state, due to the effects of temperature or caused by swirl or surge movements of the fuel in the tank. In addition fuel can also expand due to the effect of an increase in temperature. Finally, fuel is also taken from the fuel tank during operation of the motor vehicle so that the fuel tank is usually not hermetically closed off in relation to the ambient atmosphere at least at certain pressures which can obtain in the tank. It will also be appreciated that the fuel tank is opened when refuelling same. It is then necessary for the gas which is displaced out of the interior of the tank by the incoming flow of fuel in the refuelling procedure to be discharged in an appropriate manner. Depending on the respective volume flow of fuel involved in the refuelling procedure, the amounts of gas involved may be up to 60 liters per minute. It will be appreciated that the hydrocarbon-charged gases which are displaced out of the interior of the tank in that way are not discharged to the atmosphere without being filtered. For that purpose either the gas produced in the refuelling procedure can be discharged to the atmosphere by way of a fuel vapor filter, as is usual for example with systems in the United States of America, or the gas involved may be sucked away by means of a specific item of equipment at the refuelling gun, as is employed in a European system.

Apart from the above-discussed operating conditions in which the fuel tank is required to communicate directly or indirectly with the atmosphere, it is necessary at least on a short-term basis to hermetically seal off the fuel tank for a procedure referred to as on-board diagnostics checking or OBD checking. In OBD checking the fuel tank is hermetically closed off and the interior thereof is subjected to an increased pressure or a reduced pressure, with respect to atmospheric pressure, for the purposes of checking sealing integrity. If an unacceptable pressure drop is found to apply the on-board electronic system of the vehicle records a leak in the tank.

Finally, an operation of cleaning the fuel vapor filter should also be mentioned as an operating condition which has to be suitably taken into account in terms of circuitry and control procedures. In the operation of cleaning the fuel vapor filter combustion air is sucked in from the atmosphere by the internal combustion engine of the motor vehicle in which the tank is fitted, by way of the fuel vapor filter.

All the above-mentioned operating conditions of a motor vehicle require the provision of suitable valve and control procedures and equipment on the fuel tank. For the purposes of controlling the operating conditions outlined above, ventilation valves for allowing air into the tank, vent valves for the discharge of medium from the interior of the tank, diagnostic valves and purge valves as well as a suitable system for appropriately controlling those valves need to be provided to implement the various operating conditions involved. In that respect, vent systems which have been employed hitherto are designed either for checking sealing integrity by means of a reduced pressure or for checking sealing integrity by means of an increased pressure. Various valves are provided for respective ones of the various operating conditions, the valves being arranged at spacings from each other and connected with conduits. Such systems are inflexible as diagnosis of sealing integrity is desired either by means of an increased pressure or a reduced pressure, depending on the respective type of vehicle involved and its on-board electronic system. In addition, conduits between valves and filters constitute potential sources of emission of gaseous hydrocarbons which are also unwanted.

SUMMARY OF THE INVENTION

An object of the present invention is to provide a vent valve for a fuel tank, in particular for a motor vehicle, which is of a compact structure and permits a modular arrangement of ancillary units of a fuel tank.

Another object of the present invention is to provide a vent valve for a fuel tank which while being of a compact and rational structure makes it possible to implement a plurality of switching functions related to different operating states of the tank.

Still another object of the present invention is to provide a vent valve for a motor vehicle fuel tank which can be used in operative association with a fuel vapor filter such that the combination thereof can effectively minimise emissions of hydrocarbons from the tank into the atmosphere.

Yet another object of the present invention is to provide a vent valve for a fuel tank which as a single unit is capable of implementing a plurality of different states involved in operation of the tank.

In accordance with the principles of the present invention the foregoing and other objects are attained by a vent valve for a fuel tank, for example for a motor vehicle, comprising a valve housing with at least one switchable element for providing at least first and second switching positions, and with at least three connections. A first connection is to the fuel tank or to a first fuel vapor filter connected downstream thereof, a second connection is to a filling pipe of the fuel tank and a third connection is to ambient atmosphere. The valve housing includes at least one first filter chamber, and the valve further includes a second fuel vapor filter contained in the first filter chamber. A first switching position of the valve provides for operational venting of the fuel tank, in which a path is provided between the first and third connections, and a second switching position of the valve provides for refuelling venting of the fuel tank, in which a path is provided between the first and second connections, with the second fuel vapor filter being bypassed.

As will be appreciated from the description hereinafter of preferred embodiments of the vent valve according to the invention, a vent valve as outlined above, in the form of a valve of compact structure, with the plurality of switching functions for a tank refuelling situation, an operational venting situation and for the situation involving checking sealing integrity of the fuel tank can be implemented, can be considered to be particularly appropriate in regard to the above-discussed problems. In addition such a vent valve has the advantage that, if hydrocarbon-charged gases which are produced in a tank refuelling procedure have to be passed by way of a fuel vapor filter, it is possible to make a distinction between refuelling and operational venting, by means of the circuitry procedures involved. In that case the vent valve according to the invention would be connected with its first connection to the outlet of an interposed first fuel vapor filter so that the second fuel vapor filter which is disposed in the valve housing of the vent valve is bypassed in a refuelling situation.

In principle it is desirable for the fuel vapor filter to be designed in such a way that the level of hydrocarbons passing into the atmosphere is as low as possible. In spite of prior vapor filters affording a good mode of operation in that respect however it has not been possible to completely prevent the emission of such hydrocarbons into the atmosphere. The pollutants which pass into the atmosphere through the fuel vapor filter are also referred to in the language of the art as bleed emissions.

Certain limits are imposed on the efficiency of a fuel vapor filter inter alia for the reason that, in a tank refuelling operation, depending on the respective filling rate involved, up to 60 liters per minute of gas would have to be displaced from the fuel tank. That volume flow is passed by way of the fuel vapor filter. The higher the level of efficiency of the filter, the correspondingly higher is its resistance to flow therethrough so that the fuel vapor filter has a certain minimum flow transmission capability in order to ensure that the refuelling gun does not prematurely shut off in a refuelling operation. In the operational venting condition there is the danger that the above-mentioned bleed emissions can pass through the filter to the atmosphere, and this is something that is to be avoided.

Now the configuration of the vent valve according to the invention provides for the arrangement therein of an additional second fuel vapor filter which affords a reduction in bleed emissions in operation of the vehicle. In the refuelling situation that second fuel vapor filter is bypassed so that the additional filter resistance of the fuel vapor filter provided in the vent valve according to the invention does not represent an obstacle in terms of a refuelling operation.

In a preferred feature of the invention therefore the second fuel vapor filter in the first filter chamber is in the form of a second fine cleaning stage connected downstream of the fuel vapor filter of the fuel tank.

The vent valve according to the invention further has the advantage that, while involving a single structural unit as the valve, it is possible to provide for switching to the operational states of refuelling, operational venting and checking sealing integrity, more specifically by means of just two switching procedures. In that sense the valve can be referred to as a three/two way valve. In this case the connection of the vent valve according to the invention to the fuel tank is cleverly selected in such a way that one switching position of the vent valve is to be adopted both for a refuelling situation and also for a diagnostics situation. In a diagnostics situation the first and the third connections of the vent valve are connected together, the first connection is connected to the fuel tank or to the fuel vapor filter of the fuel tank and the third connection communicates with the filling pipe of the fuel tank. If the cap of the fuel tank is fitted on to the filling pipe and the cap is closed the system is thus hermetically sealed off and can be checked for sealing integrity either by being subjected to the effect of an internal reduced pressure or the effect of an increased pressure. The check in respect of sealing integrity includes the filling pipe of the fuel tank so that the on-board electronic system of the vehicle in which the fuel tank is fitted recognises when the cap is fitted and closed.

In another preferred feature of the vent valve according to the invention the switchable element is in the form of an electromagnetically actuable valve rod provided with at least first and second valve bodies which respectively co-operate with at least one associated valve seat.

In an alternative configuration of the vent valve according to the invention first and second alternately co-operative valve seats are associated with each of the valve bodies. That arrangement ensures that the flow paths through which the valve rod extends are sealed off relative to each other. Alternatively the sealing effect can be afforded by a suitable sealing portion such as a flexible sealing cuff or the like.

In a preferred feature of the invention the vent valve, without being actuated, adopts the first switching position in which a path between the first and third connections is open, being the operational venting condition.

In another preferred variant of the vent valve according to the invention a second valve seat and a second valve body which are associated with the second connection are held under a spring loading in the closed position. In the closed position of the second valve body a first valve body associated with the third connection is in the open position.

In another preferred feature of the invention the second valve body and the associated second valve seat co-operate in such a way that upon a back surge the flow of the medium passing through the valve acts in the direction of the closing force of the vent valve. As the second valve is associated with the connection to the filling pipe of the tank of the vehicle, it then acts as a rollover valve which closes off the filling pipe in the case of a rollover incident. That is advantageous insofar as an additional non-return valve or an additional rollover valve is then no longer required.

In another preferred feature of the invention the second valve body is arranged on the connection side of the associated second valve seat.

A preferred alternative configuration of the vent valve according to the invention further provides that the valve rod is in the form of an armature of an electromagnetic switching mechanism with coil, wherein when the switching mechanism is supplied with power the armature is repelled or expelled by the coil surrounding it.

In that case the valve rod can be arranged in such a way that it passes through two separate flow paths within the valve body, with a passage through a flow path being sealed off by means of a flexible sealing cuff.

Further objects, features and advantages of the invention will be apparent from the description hereinafter of preferred embodiments.

BRIEF DESCRIPTION OF THE DRAWING

FIG. 3 is a greatly simplified diagrammatic view in section of a vent valve of a first embodiment of the invention in a second switching position for refuelling venting or a diagnostics situation, FIG. 4 shows the FIG. 3 vent valve in a first switching position for operational venting.

DESCRIPTION OF PREFERRED EMBODIMENTS

Figure 1:
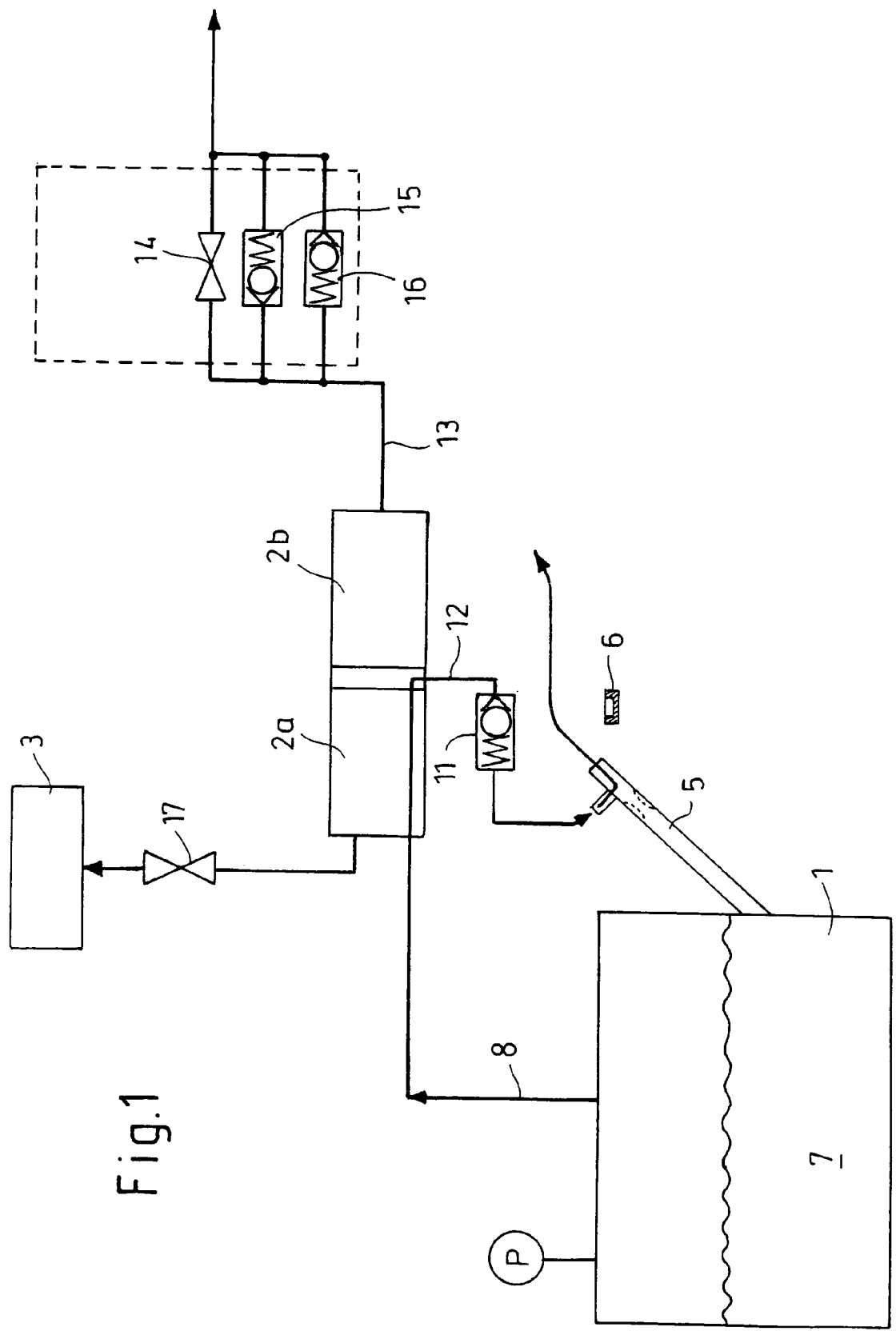
FIG. 1 is a diagrammatic view of a fuel tank with a vent system.

Referring firstly to FIG. 1, reference numeral 1 therein diagrammatically indicates a fuel tank for example for a motor vehicle, in conjunction with first and second fuel vapor filters 2a and 2b, and an internal combustion engine 3 of the motor vehicle. The FIG. 1 view only illustrates the functional relationships of the individual parts of a vent system and the switching functions to be implemented with a vent valve according to the invention as indicated at 4 in FIG. 2.

The fuel tank 1 is usually refuelled by way of a filling pipe 5 with a closure cap 6. In the refuelling operation the fuel which is introduced into the fuel tank, as indicated at 7, displaces the air/fuel vapor mixture which is to be found above the level of the fuel 7 in the tank and which is thus passed by way of a vent conduit 8 to a first fuel vapor filter 2a. Connected downstream of the first fuel vapor filter 2a in the direction of flow of the fuel vapor is a second fuel vapor filter 2b. A refuelling vent conduit as indicated at 12 in FIG. 1 extends between the first fuel vapor filter 2a and the filling pipe 2, and incorporates a non-return valve 11. The refuelling vent conduit 12 communicates with the filling pipe 5 in such a way that the gases displaced from the interior of the fuel tank 1 in a refuelling procedure are discharged to the ambient atmosphere by way of the first fuel vapor filter 2a and the filling pipe 5. In that situation the hydrocarbons are filtered out, in the first fuel vapor filter 2a.

In operation of the motor vehicle in which the fuel tank is installed the hydrocarbon-charged gases which are produced in the fuel tank 1 are discharged to the atmosphere by way of the first and second fuel vapor filters 2a, 2b and the operational vent conduit 13. In that case the second fuel vapor filter 2b serves as a fine cleaning stage of the first fuel vapor filter 2a to prevent bleed emissions.

Reference 14 in FIG. 1 indicates a diagnostics valve which is connected to the operational vent conduit 13 and which is closed during operation of the motor vehicle and during refuelling of the fuel tank. A pressure-maintaining valve 15 and a further non-return valve 16 are connected in parallel relationship with the diagnostics valve 14. A slightly increased pressure is maintained in the fuel tank 1 by way of the pressure-maintaining valve 15. Operational venting by way of the operational vent conduit 13 is effected against the increased pressure produced in the fuel tank by the pressure-maintaining valve 15. In that case the closure cap 6 is fitted on to the filling pipe 5 so that any gases occurring in the fuel tank 1 as a consequence of temperature fluctuations and surge movements of the fuel are passed to the atmosphere by way of the fuel vapor filters 2a and 2b. In the case of an operation of checking sealing integrity of the fuel tank the diagnostics valve 14 is opened for a short time in order to produce pressure equalisation between the interior of the fuel tank 1 and the ambient atmosphere. The valve 14 is then closed again and the fuel tank 1 is put under an increased pressure for the purposes of checking its sealing integrity, with that increased pressure being below the opening pressure for the pressure-maintaining valve 15. Backflushing of the fuel vapor filters 2a, 2b against a slight counter-pressure is possible by way of the non-return valve, in which case a backflushing valve indicated at 17 in FIG. 1 is opened and the internal combustion engine 3 sucks combustion air from the atmosphere by way of the fuel vapor filters 2a, 2b.

Figure 2:
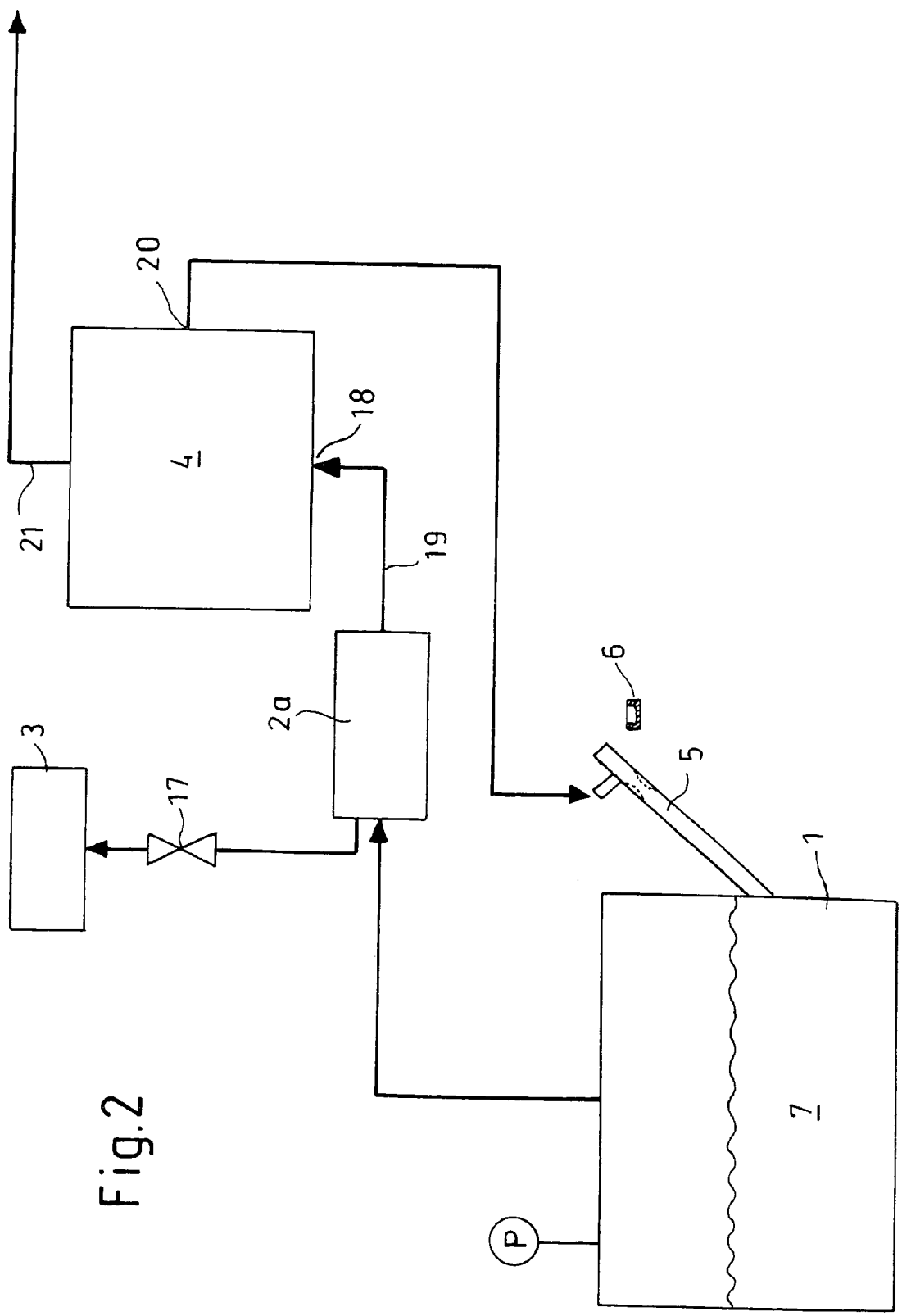
FIG. 2 is a structurally simplified diagrammatic view of a fuel tank with a vent system in which the vent valve according to the invention is symbolically and functionally illustrated.
Figure 6:
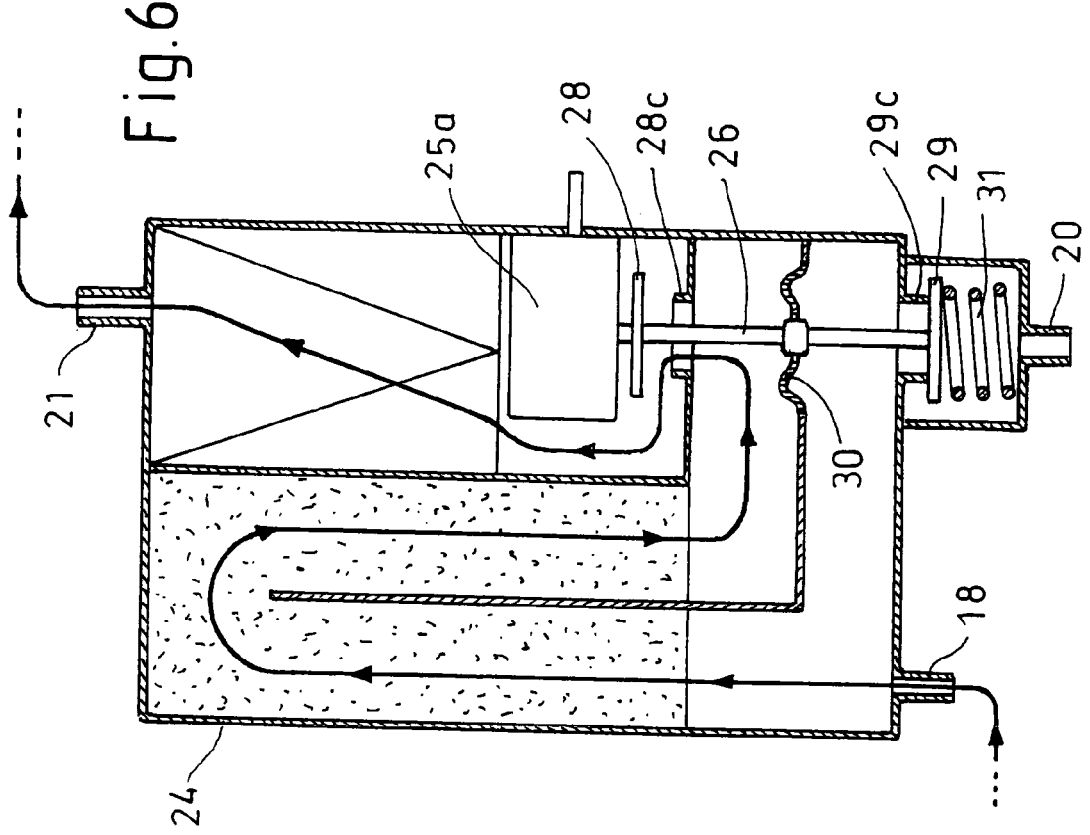
FIG. 6 is a view of the FIG. 5 valve in a first switching position for operational venting.
Figure 5:
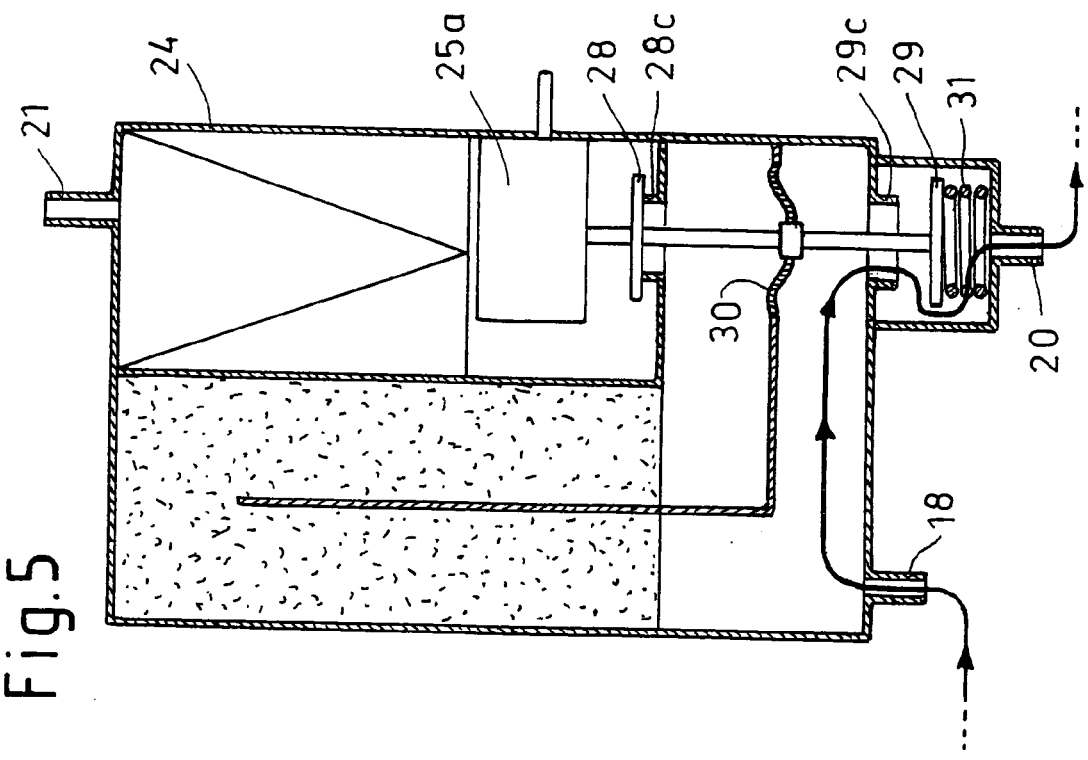
FIG. 5 shows a view of the vent valve according to the invention in a second embodiment in the second switching position for refuelling venting or checking sealing integrity.

Reference will now be made to FIG. 2 showing the diagrammatic venting system illustrated in FIG. 1, with the incorporation of the vent valve 4 in accordance with the invention. As diagrammatically indicated in FIG. 2 the vent valve 4 according to the invention combines the functionalities of the valves 11 and 14 of FIG. 1 as well as the second fuel vapor filter 2b. The more precise design configuration of the vent valve 4 can be seen for example from FIGS. 3 and 4 or from FIGS. 5 and 6 respectively, with FIGS. 3 and 4 illustrating a first embodiment of the vent valve 4 according to the invention whereas FIGS. 5 and 6 show a second embodiment thereof.

Reference will therefore now be made to FIGS. 3 through 6 generally to discuss the general structure of the vent valve 4 according to the invention.

The vent valve 4 is connected with a first connection 18 by way of a vent conduit indicated at 19 in FIG. 2 to the first fuel vapor filter 2a of the fuel tank 1. It may be noted at this point that the first connection 18 may alternatively be connected directly to the fuel tank 1. A second fuel vapor filter 2b, as discussed in relation more specifically to FIG. 1, is integrated into the vent valve 4.

A second connection as indicated at 20 of the vent valve 4 is connected to the filling pipe 5 of the fuel tank 1.

A third connection 21 of the vent valve 4 communicates with atmosphere.

Referring now more specifically to FIGS. 3 and 4, provided in the vent valve 4 are first and second switching paths indicated by means of respective arrows in each of those Figures. The vent valve 4 includes a first filter chamber 22 which encloses a second fuel vapor filter 2b as a second filter stage for filtering the bleed emissions from the fuel tank 1, and a second filter chamber 23 containing a backflush filter (not indicated). The backflush filter serves to prevent particles of dirt from being sucked in from the ambient atmosphere in the operation of cleaning the fuel vapor filters.

Reference 24 in FIGS. 3 and 4 denotes a valve housing of the vent valve 4. Provided in the valve housing 24 is an electromagnetic actuator 25 including a coil 25a and a valve rod 26 as an armature. Provided on the valve rod 26 are first and second valve bodies 28 and 29 which are each of a plate shape and which each co-operate with two respective diametrally oppositely arranged seats 28a, 28b and 29a, 29b respectively. The valve housing 24 defines first and second flow paths, the configurations of which can be seen by reference to the arrows shown in FIG. 3 and FIG. 4 respectively.

Looking now at FIG. 3, therein the electromagnetically actuated valve is switched in such a way that the first connection 18 and the second connection 20 communicate with each other. In that switching condition the second fuel vapor filter 2b contained in the first filter chamber 22 is bypassed. The coil 25a is supplied with power and the valve pushrod 26 is attracted, that is to say moved upwardly in FIG. 3, so that the first valve body 28 is drawn into contact against the valve seat 28a and the second valve body 29 bears against the valve seat 29a. That switching condition corresponds to the refuelling situation or the fuel tank sealing integrity checking operation (OBD checking). When checking the sealing integrity of the fuel tank the closure cap 6 is fitted on to the filling pipe 5 so that the fuel tank 1 is hermetically sealed off in relation to atmosphere.

In the switching condition shown in FIG. 4 the valve pushrod 26 is extended out of the coil 25a, this corresponding to the current-less condition in operation of the motor vehicle, for operational venting. It will thus be seen from FIG. 4 that the first valve body 28 is in a condition of bearing against the valve seat 28b while the second valve body 29 is in a condition of bearing against the valve seat 29b so that the second connection 20 which is in communication with the filling pipe 5 is closed. In contrast, the flow path is enabled through the first filter chamber 22 and the second filter chamber 23 to the third connection 21 communicating with the ambient atmosphere. The gases from the fuel tank 1, which have already been cleaned through the first fuel vapor filter 2a, are in that way passed once again by way of the fine cleaning stage of the second fuel vapor filter 2b in the first filter chamber 22 of the vent valve. That effectively prevents bleed emissions.

Looking once again at FIG. 3, reference 32 therein denotes a passage providing a communication between the respective sides of a partition 33, the passage 32 being arranged in such a way that, if it were to be totally open, it would permit a communication between the flow path indicated by the arrowed line in FIG. 3 and the flow path indicated by the arrowed line in FIG. 4. When FIGS. 3 and 4 are considered in combination however it will also be seen that, in each of the positions of the valve pushrod 26 shown in FIGS. 3 and 4, the communication between those two possible flow paths in the form of the passage 32 through the petition 33 is closed, more specifically, in the situation shown in FIG. 3, by the second valve body 29 bearing against the valve seat 29a and in the situation shown in FIG. 4 by the first valve body 28 bearing against the valve seat 28b. As an alternative the passage 32 through the partition 33 can be sealed off by a means such as a diaphragm or a sealing sleeve as indicated at 30 in FIGS. 5 and 6 to which reference will now be made.

Looking therefore at FIGS. 5 and 6, shown therein is a further embodiment of the vent valve 4 according to the invention. The vent valve 4 illustrated in FIGS. 5 and 6 also takes account of a condition of the vehicle in which the fuel tank is fitted, which is commonly referred to as rollover. In this embodiment, only one valve seat 28c and 29c is associated with each of the valve bodies 28 and 29 respectively. When the coil 25a is powered up, the valve pushrod 26 is repelled or expelled therefrom while in addition the valve pushrod 26 passes through both of the flow paths indicated by the arrowed lines in FIG. 5 and FIG. 6 respectively. To mutually seal off the flow paths in the region where the valve pushrod 26 passes through the partition which is referenced 33 in FIG. 3 and shown in FIGS. 5 and 6 but not referenced therein, the structure shown in FIGS. 5 and 6 has a sealing cuff 30 of a resilient material.

FIG. 5 once again shows a refuelling condition or an OBD condition in which the first connection 18 and the second connection 20 communicate with each other, as indicated by the arrowed line. In this position of the arrangement the second valve body 29 is held in the opened position against the pressure force of a spring 31. In that condition, the coil 25a is powered up both for a refuelling procedure and also for the OBD procedure. The first valve body 28 is pressed against the associated valve seat 28c.

FIG. 6 shows the condition for operational venting in which the coil 25a is unpowered. The second valve body 29 is here pressed by the spring 31 against the valve seat 29c which is thereby closed, whereas the first valve body 28 is in an open position so that the first connection 18 and the third connection 21 can communicate with each other by way of the second fuel vapor filter 2a contained in the first filter chamber shown in FIGS. 5 and 6 and indicated at 22 in FIG. 3. This arrangement enjoys the advantage that the second valve body 29 and the second valve seat 29c are arranged on the side of the second connection 20 which is towards the filling pipe so that, in a vehicle rollover situation, the hydrostatic pressure of the column of liquid fuel from the filling pipe 5 acts in the closing direction of the valve, and thus presses the valve body 29 against the valve seat 29c to close it off.

It will be appreciated that the above-described embodiments of the invention have been set forth solely by way of example and illustration of the principles of the invention and that various modifications and alterations may be made therein without thereby departing from the spirit and scope of the invention.

What is claimed is:

1. A vent valve for a fuel tank including:
   a valve housing,
   at least one switchable element in the valve housing and operable to provide at least first and second switching positions, and
   at least first, second and third connections on the valve housing comprising a first connection for at least indirect connection to the fuel tank, a second connection to a filling pipe of the fuel tank and a third connection to atmosphere,
   the valve housing including at least one first filter chamber which includes a fuel vapor filter,
   the arrangement being such that a first switching position of the switchable element provides for operational venting of the fuel tank in which a flow path between the first connection and the third connection is enabled and a second switching position of the switchable element provides for refuelling venting of the fuel tank in which a flow path between the first and second connections is enabled with the fuel vapor filter being bypassed.

2. A vent valve as set forth in claim 1
   wherein a further fuel vapor filter is connected in use between the first connection and the fuel tank.

3. A vent valve as set forth in claim 2
   wherein the fuel vapor filter in the first filter chamber is in the form of a second cleaning stage connected downstream of the further fuel vapor filter.

4. A vent valve as set forth in claim 1
   wherein the switchable element includes a valve rod with at least first and second bodies,
   wherein the valve housing includes at least one associated valve seat respectively co-operable with the valve bodies,
   and including electromagnetic actuation means for actuating the valve rod.

5. A vent valve as set forth in claim 4
   wherein first and second alternately co-operative valve seats are associated with each valve body.

6. A vent valve as set forth in claim 4 including
   spring means adopted to hold a valve seat and a second valve body which are associated with the second connection in the closed position.

7. A vent valve as set forth in claim 6
   wherein in the closed position of the second valve body a first valve body associated with the third connection is in an opened position.

8. A vent valve as set forth in claim 4
wherein the arrangement of the second valve body and the associated second valve seat is such that upon back surge the flow of medium through the valve acts in the direction of the closing force of the valve.

9. A vent valve as set forth in claim 4
wherein the electromagnetic actuation means includes an electromagnetic switching mechanism with coil,
wherein the valve rod forms an armature of the electromagnetic actuation means in the coil,
the arrangement being such that when the switching mechanism is supplied with current the armature is repelled by the coil surrounding same.

10. A vent valve as set forth in claim 4
wherein the valve housing includes wall means defining first and second separate flow paths, with the valve rod passing through the flow paths,
a passage communicating the flow paths, and
a flexible sealing cuff sealing off said passage.

11. A vent valve for a fuel tank including:
a valve housing,
at least one switchable element in the valve housing and operable to provide at least first and second switching positions,
a first fuel vapor filter including an inlet connection for connection in use to a said fuel tank, and an outlet connection,
at least first, second and third connections on the valve housing comprising a first connection for connection to the outlet of the fuel vapor filter, a second connection to a filling pipe of the fuel tank and a third connection to atmosphere,
the valve housing including at least one first filter chamber which includes a second fuel vapor filter,
the arrangement being such that the first switching position of the switchable element provides for operational venting of the fuel tank in which a flow path between the first connection and the third connection is enabled and the second switching position of the switchable element provides for refuelling venting of the fuel tank in which a flow path between the first and second connections is enabled with the second fuel vapor filter being bypassed.

* * * * *